DIFFERENTIAL AMPLIFIER CIRCUIT FOR MAGNETIC MEMORY SENSING
Filed April 28, 1961
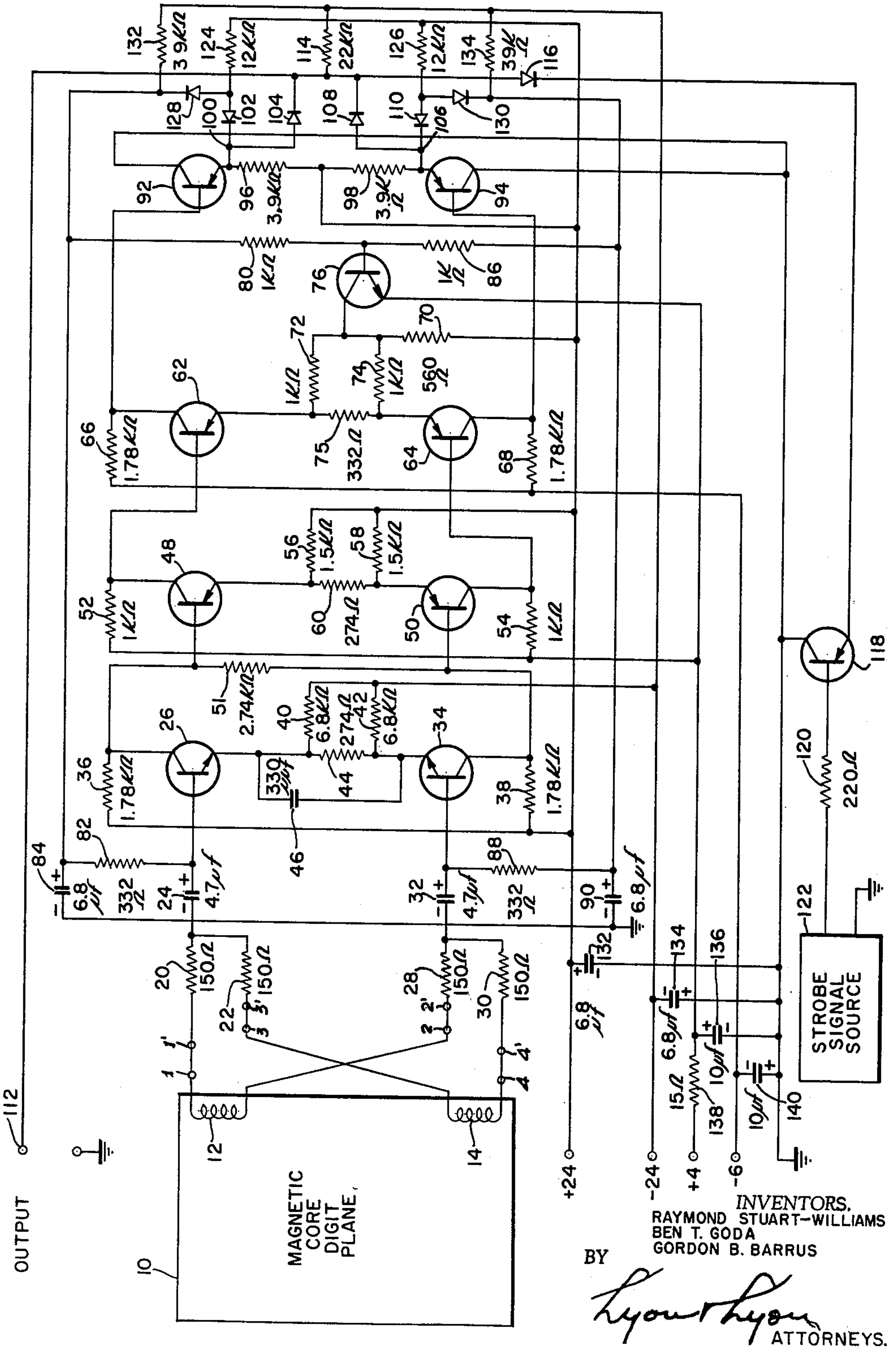
INVENTORS.
RAYMOND STUART-WILLIAMS
BEN T. GODA
GORDON B. BARRUS
BY
Lyon & Lyon
ATTORNEYS.

3,168,708

DIFFERENTIAL AMPLIFIER CIRCUIT FOR MAGNETIC MEMORY SENSING

Raymond Stuart-Williams, Pacific Palisades, Ben T. Goda, Gardena, and Gordon B. Barrus, El Segundo, Calif., assignors to Ampex Corporation, Culver City, Calif., a corporation of California Filed Apr. 28, 1961, Ser. No. 106,393
8 Claims. (Cl. 330—22)

This invention relates to amplifier circuits and, more particularly, to an improved amplifier circuit best suited for use in sensing data outputs from magnetic memories.

The design of a reading or sense amplifier, which is connected to the sense winding of a digit plane in a magnetic-core memory, has always presented a difficult problem. In the early days of magnetic-core memories, the problem was so difficult that the designs of the core memories were conditioned almost entirely by the need to reduce the difficulty of designing the amplifier. As amplifier designs improved, less and less of the design of the memory itself has been conditioned by amplifier restrictions, until presently a state has been reached in which almost all the problems encountered in the memories are thrown into the amplifier circuit. Consequently, the design of an adequate amplifier is of major importance.

The presently favored design for magnetic-core memories employs for readout purposes a sense winding which is inductively coupled to the cores from which a readout is desired. The sense winding is usually allowed to float electrically, and its two ends are connected to the two input terminals of an amplifier, usually a difference amplifier. The function of this difference amplifier is to reject common-mode signals, occasioned by the whole sense winding moving, and to amplify the difference signals, which are presented at the ends of the winding. In any large common-mode action there is also some proportion which is a difference action, as it is almost impossible to balance the sense windings perfectly with respect to ground. The difference signal due to this unbalance is often of more importance than the common-mode signal itself, and, for this reason, great care is always taken to try to achieve the maximum balance in designing a sense winding and in designing the connection between the sense winding and the sense amplifier.

Another signal which appears at the terminals of the sense winding and against which some measure of protection must be taken is a difference signal due to the "delta" effect. The delta effect is the change in magnetic condition of cores which occurs in response to half-drives. If a small number of cores are involved, the delta-effect signal is small and decays sufficiently so that it has very little or no effect on a desired signal. However, with a large number of cores being affected by half-drives without precautions being taken, the delta-effect signal can prove troublesome.

Large common-mode signals appear when a drive is applied to the memory and also when a drive is turned off. The one that occurs when the digit drive is turned off is particularly important, as this may be shortly before the next reading time. These signals are normally differentiated and are consequently narrow, but the amplitude is so large that the width at the base of the signal is frequently equal to the switching time of the core. As previously pointed out, the difficulty in properly balancing the sense winding can lead to difference signals which are induced by the writing drive into the memory, which, together with the delta signals, can provide a signal having a substantial amplitude. Such a difference signal requires a long time before it decays to some reasonably low value, and, consequently, the sense winding must be terminated in such a manner so that the loop time-constant, due to the winding and the input impedance of the amplifier, is short. Since the sense winding is essentially an inductance, this means that the sense winding must feed a high-resistance load.

Another requirecent of the reading amplifier is that it must handle a considerable bandwidth. The time between reading cycles is changeable, subject to the control of the computer, and thus the information transmitted through the sense winding can also change, depending upon the information that is stored and the order in which it is read out. Consequently, considerable variation occurs from cycle to cycle and even over rather long-term periods. Thus, the sense amplifier must handle a frequency spectrum extending from at least 1,000 cycles per second to several megacycles, and the amplifier must be essentially flat over this frequency spectrum.

It is an object of this invention to provide a novel and useful sense amplifier which provides a better unwanted signal rejection when used in conjunction with a magnetic-core memory than was obtainable heretofore.

It is another object of this invention to provide a novel difference amplifier which provides better common-mode rejection than was attainable heretofore.

Yet another object of this invention is the provision of a novel high-impedance input high-gain amplifier having adequate bandwidth to truly amplify a signal which is sensed in a magnetic-core memory.

The signals originating in the sense winding of a magnetic-core memory being read are amplified and then an amplitude-time-dependent detector is used to determine whether the signals are "zero" or "one." The voltage amplification required is rarely less than 100 and may be in excess of 1000. In an amplifier having this much gain, the D.C. indeterminacy of level due to transistor characteristics, tolerance, temperature, and aging is usually in access of the amplitude of the desired signal. Alternating-current coupling must be used to remove this D.C. indeterminacy, as detection must be amplitude dependent. Introduction of A.C. coupling, whether by capacitance, transformers, or inductance, in every case, has made the amplifiers pattern-sensitive. That is, in response to a certain readout pattern, a saturation of transformers or inductance occurs, or capacitors become charged up, whereby nonlinearities occur as well as unpleasant long-term recovery effects. While the amplifier must not be pattern-sensitive, it must reject or at least gate out both A.C. and D.C. common-mode signals. Further, the output must be well clamped to reject any D.C. difference signal that may have been introduced in the process of amplification. The problem of removing this D.C. is one of considerable magnitude. It is further complicated by the fact that there is essentially no stable base line present in the signal received from the sense winding when output from the sense winding is a continuous series of pulses. Consequently, it is extremely difficult to use D.C. restoration or other simple techniques for removing this undesired D.C. component. The D.C. problem in every design in the past, without exception, has been avoided by using an A.C. coupled amplifier. As a result of this, the amplifiers have been made pattern-sensitive. Typical symptoms associated with this effect are that the amplifier will amplify a pulse at one polarity much better than one of the opposite polarity, and that the common-mode rejection of the amplifier becomes very poor.

A still further object of this invention is the provision of an amplifier suitable for use in sensing the output of a magnetic-core memory which is not pattern-sensitive, yet operates to eliminate both D.C. and A.C. common-mode signals.

These and other objects of the invention are obtained by providing a difference amplifier having an extremely high-input impedance and which is essentially D.C. coupled, but has virtually zero gain for direct current. In order to fix a base level from which a signal output is obtained, despite variations in the levels of signals received from the sense winding, a common-mode voltage feedback is provided in the amplifier. In addition, in order to substantially stabilize the base of the output despite variations in the input-pulse pattern basis, feedback with very little attenuation from output to input under D.C. or low-frequency conditions is provided through a network whereby the output alternating current is quantized at a very low level and is effectively stripped from the direct-current level. Thus, although in practice there is no base line in the signal occurring within the reading amplifier, the excursions of the output signal tend to be close to a base line and thoroughly symmetrically disposed about it.

The novel features that are considered characteristic of this invention are set forth with particularity in the appended claims. The invention itself, both as to its organization and method of operation, as well as additional objects and advantages thereof, will best be understood from the following description when read in connection with the accompanying drawing, which is a circuit diagram of an embodiment of the invention.

Reference is now made to the drawing, which is a circuit diagram of an embodiment of the invention. In this circuit diagram, values of the components employed in one embodiment of the invention which was built are as shown. This is shown by way of illustration only, and should not be construed as a limitation upon the invention, since those skilled in the art will readily appreciate how these various component values may be altered to achieve different modes of operation without departing from the spirit and scope of this invention, as set forth in the claims.

There is shown a rectangle 10, representing a magnetic-core digit plane in a magnetic-core memory. Such memories are well known in the art and usually comprise a plurality of these digit-core planes. Each of these digit-core planes has a plurality of toroidal magnetic cores arranged in columns and rows, and each of these cores can store a binary bit of information by its state of magnetization. Customarily, in order to store a word made up of binary bits, the state of magnetization of a correspondingly located core in each one of the digit planes is altered to represent a binary bit in the word. In each one of the magnetic-core digit planes there is provided at least one sense winding, which is a winding which is inductively coupled to all the cores in the digit plane. Preferably, however, to secure a better operation of the memory, two sense windings, respectively represented by the inductances 12 and 14, are employed with each core digit plane. These sense windings terminate in terminals 1, 2, 3, and 4 as shown, and each is inductively coupled to one-half of the cores of the magnetic-core digit plane.

When it is desired to read out the data which is stored at a given location in a magnetic-core memory, a reading drive is applied to windings coupled to the digit-core planes, whereby a magnetic core in each digit-core plane is driven toward a predetermined magnetic state. Those cores, which are not in that predetermined magnetic state, are driven to that state, in the course of which a signal may be induced in the sense winding coupled to that core. Those cores which are already in that predetermined magnetic state do not cause any signal to be induced in the sense winding attached thereto. A sense amplifier, which is connected to the outputs of the sense windings, has the task of amplifying the signal induced in the sense winding from the core which has been driven and rejecting any and all other signals which, as has been previously described, are caused to exist in the sense winding as the result of the operation of the memory.

The output terminals 1, 2, 3, 4 of the respective sense windings 12, 14 are connected to the corresponding input terminals 1', 2', 3', 4' of the sense amplifier. This is noteworthy, since, in the past, when it was attempted to employ a single sense amplifier to amplify the signals from more than one sense winding, in order to avoid extensive attenuation of signals received from the sense windings due to the mixing network normally used, a preamplifier had to be employed. As a result, the time constant of the sense winding and its output was lengthened, whereby unwanted difference signals in the sense winding would not decay sufficiently rapidly and would thus interfere with the desired reading signal. With the sense amplifier built in accordance with this invention, despite the presence of the mixing network, a sufficiently high impedance is presented to the sensing windings so that their time-constants remain sufficiently short, thereby avoiding the above-noted adverse effects.

Terminals 1' and 3' are connected through the respective resistors 20, 22 to a capacitor 24. The capacitor 24 couples the respective resistors 20, 22 to the base of a transistor 26. Similarly, the terminals 2', 4' are connected through resistors 28, 30 to a capacitor 32. The capacitor 32 couples these resistors 28, 30 to the base of a transistor 34. The capacitors 24, 32 are inserted for purposes which will be specified later herein. Operating potential for the transistors 26, 34 is applied through the respective resistors 36, 38 to the collectors of these transistors from a +24 volt-potential source. Similarly, a −24 volt-potential source is connected through the resistors 40, 42 to the respective emitters of the transistors 26, 34. These emitters are connected to one another through a resistor 44, with which a capacitor 46 is connected in parallel.

Output from transistor 26 is taken from its collector, which is connected to the base of a transistor 48. Output from the transistor 34 is taken from its collector, which is connected to the base of a transistor 50. These two bases are connected to one another through a resistor 51. A +4 volt-potential source is connected through resistors 52, 54 to the respective collectors of transistors 48, 50. The +24 volt-potential source is connected through resistors 56, 58 to the respective emitters of transistors 48, 50. A resistor 60 is connected between the emitters of transistors 48, 50.

The collector of transistor 48 is connected to the base of transistor 62. The collector of transistor 50 is connected to the base of the transistor 64. A −6 volt-potential source is connected through the resistors 66, 68 to the respective collectors of transistors 62, 64. The +24 volt-potential source is connected through a resistor 70 to the resistors 72, 74. Resistor 72 is connected to the emitter of transistor 62. Resistor 74 is connected to the emitter of transistor 64. A resistor 75 connects the emitter of transistor 62 to the emitter of transistor 64.

The junction of resistors 70, 72, and 74 is connected to the collector of a transistor 76. The emitter of transistor 76 is connected to the +4 volt-potential source. The base of transistor 76 is connected through a resistor 80 to the junction of a resistor 82 and a capacitor 84. The base of transistor 76 is also connected through another resistor 86 to the junction of a resistor 88 and a capacitor 90. Resistor 82, in turn, is connected to the base of the transistor 26, and resistor 88 is connected to the base of transistor 34. Capacitors 84, 90, in turn, are connected together and to the line from the −24 volt-potential source.

Output from the transistor 62 is applied to a succeeding transistor 92 by way of a connection between the collector of transistor 62 to the base of transistor 92. Output from transistor 64 is applied to a succeeding transistor 94 by way of a connection between the collector of transistor 64 and the base of transistor 94. The +24 volt-potential source is connected through a resistor 96 to the emitter of transistor 92 and through a resistor 98 to the emitter of transistor 94. The collectors of the respective transistors 92, 94 are connected together and to ground.

Transistors 92 and 94 are connected as emitter followers. Output is taken from the emitter of transistor 92 and applied to a junction 100, to which two oppositely poled diodes, respectively 102, 104, are connected. Output is taken from the emitter of transistor 94 and applied to a junction 106, to which two oppositely poled diodes, respectively 108, 110, are connected. Diodes 104 and 108 are thereafter connected together and to an output terminal 112. A resistor 114 connects the −24 volt-potential source to this output terminal. Coupling is also made from the output terminal through a diode 116 to the emitter of a strobe transistor 118. A collector of this strobe transistor is connected to ground, and the base is connected through a resistor 120 to a strobe signal source 122.

Diode 102 is coupled through a resistor 124 to the +24 volt-potential source. Diode 110 is coupled to a resistor 126 which is coupled to the +24 volt-potential source. A feedback diode 128 is connected between the diode 102 and the junction of the resistor 82 and the capacitor 84. Another feedback diode 130 is connected between the diode 110 and the junction of the capacitor 90 and resistor 88. A resistor 132 connects the −24 volt-potential source to the diode 128. A resistor 134 connects the −24 volt-potential source to the diode 130.

A capacitor 132 is employed to bypass the +24 volt-source of potential to ground. A capacitor 134 is employed to bypass the −24 volt-potential source to ground. A capacitor 136 is employed to bypass the +4 volt-potential source to ground. This capacitor is connected to the +4 volt-potential source through a resistor 138. A capacitor 140 is employed to bypass the −6 volt-potential source to ground.

That portion of the amplifier comprising transistors 26, 34, 48, 50, 62, and 64 and the circuit arrangements for successively amplifying the signal received from transistors 26, 34 to transistors 62, 64 constitutes the usual well-known difference amplifier, wherein common-mode signals applied to the bases of transistors 26 and 34 are not amplified and difference signals are amplified. The transistors 26, 34 are NPN transistors and the transistors 48, 50, 62, and 64 are PNP transistors. This choice is made because there is the least danger of the first-stage transistors becoming saturated and the poor recoverey time characteristic of NPN transistors can be tolerated at that point. However, the following transistor stages require the use of PNP-type transistors, since the signal applied to these following stages has already received some amplification, and therefore saturation or cutoff can occur easily.

Almost the entire common-mode rejection occurs in the first stage, but some does occur in the second stage. If there is any unbalance of D.C. current in an amplifier, this tends to shift the beta of a stage and consequently deteriorates the common-mode rejection and alters the gain that is exhibited to positive-going and negative-going signals. This has been compensated, to some extent, by using the NPN, PNP configuration shown. Thus, any increase in current in transistor 26 results in an increase in current in transistor 48, since the beta of that transistor also increases. But this will decrease the current in transistor 62, and the beta in this transistor will decrease. Therefore, there is some tendency toward maintaining constant gain.

The absence of any capacitance in the circuit other than stray capacitance also tends to yield rapid recovery from paralysis conditions. The only capacitance that is generally needed is shown between the emitters of transistors 26 and 34. This capacitance is small, yielding a time-constant on the order of a fraction of a microsecond, and is also placed at a position where cutoff or saturation are unlikely. Thus, common-mode inputs to the bases of transistors 26, 34 can move through a very large excursion with very little danger of cutoff or saturation to this stage. The direct-current difference potential between the base and the emitter of transistors 26 and 34 is indeterminate within a region of ±0.1 volt. Assuming that the inputs to the respective bases of these transistors are identical and that there is a difference of 0.2 volt between the respective emitter potentials, there is then established a difference of potential between the collectors of nearly two volts. This, alone, is enough to cut off either transistor 48 or 50 and to saturate the other transistors.

In practice, it is necessary to hold the mean output potential to within ±.25 volts, which corresponds to a balance at the input of the amplifier of less than one millivolt. Clearly, no amount of compensation or degeneration can achieve this degree of balance. In accordance with this invention, feedback is employed to solve this problem.

Since three stages are employed in the difference amplifier, each of which phase-inverts its input, the output of transistor 62 is out of phase with the input to transistor 26, and, likewise, the output of transistor 64 is out of phase with the input to transistor 34. If, therefore, the output from transistor 62 is fed back to the input to transistor 26 through a low-pass filter and the output of transistor 64 is fed back to the input to transistor 34 through a low-pass filter, the gain of the amplifier for direct current will be substantially zero. The low-pass filter for transistor 26 comprises the diodes 102, 128, the resistors 124, 132, and the capacitor 84. The low-pass filter for transistor 34 comprises the diodes 110, 130, the resistors 126, 134, and the capacitor 90. Feedback from transistor 62 occurs through the emitter-follower 92, diodes 102, 128, and resistor 82 to the base of transistor 26. Feedback from transistor 64 occurs through the emitter-follower 94, diodes 110, 130, through resistor 88 to the base of transistor 34. The function that the capacitors 24 and 32 play in this amplifier is to present a high impedance to the signal being fed back from the output of the amplifier to its input. Otherwise, the signal being fed back would be attenuated, by reason of the presence of the low-resistance sense winding and mixing resistors to the point where the required balance of both halves of the difference amplifier is not obtainable.

The reason for using the emitter followers 92, 94 is to change the output impedance of the differential amplifier from a high to a low value. This is required because the feedback resistors 82, 88 must be relatively low, and, therefore, any changes in base current in transistors 26 and 34, due to changes in their temperatures, will effect the feedback loop relatively seriously. By using the emitter-followers, which reduce the output impedance of the amplifier, the impedance seen by the low-pass filters is low, and thus the time-constant is made small, and, with it, any problem of shifting levels with changing of patterns is eliminated.

To further reduce the impedance of the feedback path, a network of diodes and resistors are employed at the outputs of the two emitter-followers 92, 94. The values of resistors 132 and 124 and 126 and 134 are selected so that twice as much current will respectively flow through resistors 126 and 124 as flows through resistors 132 and 134. The current through resistor 124 divides between diodes 102 and 128, and the current flowing through resistor 126 divides between diodes 110 and 130. This occurs when the amplifier is balanced. A small part of this current flows into the bases of the transistors 26 and 34. Under these circumstances, the path from the emitter-follower to the smoothing capacitors 84, 90 has very low impedance, and the time constant is short. Consequently, there is feedback with very little attenuation from output to input under direct-current or low-frequency conditions, and the output voltages tend to clamp at a potential that is very close to the input voltage. The impedance, as the result of this circuitry, is so low that the input coupling capacitors 24, 32 are not absolutely necessary and can be removed, if desired.

Whenever there is an excursion at the output which exceeds a few tenths of a volt, one or the other of the diodes 102, 110 will be cut off and the one of the capacitors 84, 90 associated with the cut-off diode will tend to charge in a linear manner, regardless of the amplitude of the output excursion. By this means, the output alternating current is quantized at a very low level and is effectively stripped from the direct-current level. In practice, although there is no base line in the signal occurring within the reading amplifier, the excursions tend to be close to a base line and fairly symmetrical about it. Consequently, this circuit clamps very accurately.

As thus far described, the amplifier which is the embodiment of this invention is a very effective difference amplifier which has the further property, however, that there is no determinate point at which the output potential will set, which is a true difference-amplifier characteristic. In the quiescent state, the two output emitter-followers will always set at the same potential, but nothing within the circuit determines where this will be. The feedback arrangement, including transistor 76 and its associated components, is employed to determine the output potential setting or the base level from which amplification occurs. In adding such additional feedback, it is very important to insure that no additional time-constants are introduced. In view of the high gain provided by the amplifier, any additional phase shifting can cause oscillation. Thus, the feedback must be very carefully introduced, as is shown in the drawing.

The resistors 80 and 86 are selected to have an equal value. They connect both feedback paths of the difference amplifier to the base of transistor 76, and, thus, the voltage at this base is the mean common-mode potential of the output. Since the emitter of transistor 76 is connected to the +4 volt-potential source at which it is desired to clamp the output of this amplifier, the transistor acts as a very sensitive comparator of this signal applied to its base with the clamping voltage. The result of this comparison is injected into the amplifier in an amplified form and in the appropriate phase by varying the source potential of the emmitter circuits of transistors 62 and 664, the last amplification stage of the amplifier in accordance with the results of the comparison. This is effectuated by reason of the collector of transistor 76 being connected to the junction of resistors 72, 74, and 70. Thereby the current variations of transistor 76 determine the bias currents applied to the emitters of transistors 62 and 64 and thereby the output base level is clamped.

With the arrangement shown there is sufficient gain provided to insure very adequate clamping of the output. This common-mode feedback must be injected at a late stage in the amplifier, as there is a considerable common-mode degeneration in both the first and second stages of the circuit. The arrangement shown acts to clamp the output difference potential so well that, if desired, the resistors 80 and 86 may be omitted and the true common-mode potential need not be fed back. Instead, the base of transistor 76 may be connected to either one of the feedback paths.

Output to the terminal 112 is derived from the emitters of the emitter-followers 92, 94 through diodes 104, 108, which are poled in such a manner so that only positive-going signals can pass through them. During the quiescent period, transistor 118 is maintained conducting with a voltage on the order of +4 volts applied to its base. Accordingly, the output terminal 112 is clamped at substantially four volts maximum through diode 116, since the emitter of transistor 118 will not appreciably exceed its base potential. When the strobe signal is applied to the base of transistor 118 from the source 122, the strobe signal lifts the base to 8 volts, whereby diode 116 blocks and an output may be taken from the transistors 92, 94, which, however, cannot exceed eight volts. In practice, the amplified "one" signal from the sense winding usually does exceed eight volts, and an output pulse with a flat top is obtained at the output terminal.

There has accordingly been described and shown herein a novel and useful amplifier circuit which, although designed specifically to find its optimum use in conjunction with magnetic-core memories, should not be considered as restricted thereto. The amplifier provides the desired operation of an alternating-current amplifier, yet is not pattern-sensitive nor does it respond to direct current. It has the requisite bandwidth and although direct-coupled is stable. Although the embodiment of the invention is shown using transistors of the impurity type indicated in the drawings, those skilled in the art will be able, without departing from the spirit or scope of this invention, to substitute transistors of other impurity types. Thus, this feature of the invention is to be taken as exemplary, and not as limiting. Furthermore, because of the high input impedance, this amplifier may be used with more than two sense windings coupled to its input, if required.

We claim:

1. In a differential amplifier of a type having a pair of input stages and output stages each stage including a pair of amplifiers, means coupling for signal amplification one of said pair of input-stage amplifiers to one of said pair of output-stage amplifiers, and means coupling for signal amplification the other of said pair of input-stage amplifiers to the other of said pair of output-stage amplifiers, the improvement comprising a first feedback path connected from the output of said one of said pair of output-stage amplifiers to the input of said one of said pair of input-stage amplifiers, a second feedback path connected from the output of said other of said pair of output-stage amplifiers to the input of said other of said pair of input-stage amplifiers, each of said first and second feedback paths including a low-pass filter and means for causing a direct current to flow in said feedback paths to lower the impedance of said feedback paths, and means for clamping the base level of the output-difference potential of said differential amplifier including a source of potential having a level at which it is desired to clamp, means connected to said first and second feedback paths for combining signals in said paths and obtaining a resultant signal, means for comparing said resultant signal with said source of potential, means for applying a bias to each of said pair of output-stage amplifiers to establish the output base level thereof, and means for determining the bias applied to each of said pair of output-stage amplifiers responsive to the output of said means for comparing to substantially clamp said differential amplifier output base level at the level of said desired source of potential.

2. In a differential amplifier as recited in claim 1 wherein each of said pair of output-stage amplifiers comprises an output transistor having an emitter, collector and base, means for applying signals from a preceding stage of said differential amplifier to the respective bases of said output stage transistors, and means for deriving respective outputs from the respective collectors of said output stage transistors, said means for comparing said resultant signal with said source of potential includes a comparator transistor having base, emitter and collector, said means for applying a bias to each of said pair of output-stage amplifiers includes a first resistor, a second and third resistor each having one of their ends connected to one end of said first resistor and the other of their ends connected to the respective emitters of the respective output transistors, a first source of potential connected to the other end of said first resistor, means connecting the base of said comparator transistor to said means for combining signals, means connecting the collector of said comparator transistor to said one end of said first resistor, a second source of potential and means connecting the emitter of said comparator transistor to said second source of potential.

3. In a differential amplifier as recited in claim 1 wherein each of said output-stage amplifiers includes an emitter-follower stage comprising a transistor having emitter, base, and collector electrodes, a source of negative potential connected to each transistor collector, a first source of positive potential, a first and second resistor each respectively connected between said first source of positive potential and a separate one of the emitters of the transistors, said means for causing a direct current to flow in said first feedback path to lower the impedance of said feedback path includes a first and second diode having their anodes connected together to form a first junction, means connecting the cathode of said first diode to the emitter of one of said transistors, means connecting the cathode of said second diode to the input of said one of said pair of input-stage amplifiers, a third resistor connected between said first source of positive potential and said first junction, and a fourth resistor connected between said source of negative potential and said second diode cathode, said fourth resistor having a substantially greater resistance value than said third resistor, said means for causing a direct current to flow in said second feedback path to lower the impedance of said feedback path includes third and fourth diodes having their anodes connected together to form a second junction, means connecting the cathode of said third diode to the emitter of the other of said transistors, means connecting the cathode of said fourth diode to the input of said other of said pair of input-stage amplifiers, a fifth resistor connected between said first source of positive potential and said second junction, and a sixth resistor connected between said source of negative potential and said third diode cathode, said sixth resistor having a substantially lower resistance value than said fifth resistor.

4. A differential amplifier having a plurality of successive stages of amplification including an input stage and a next to last stage, each of said successive stages including a pair of opposed amplifiers, the pair of amplifiers in said input stage comprising a first and second transistor each having base, emitter, and collector electrodes, the pair of amplifiers in said next to last stage comprising a third and fourth transistor each having base, emitter and collector electrodes, a first source of bias potential, a second source of bias potential, means for applying bias from said first source of bias potential to the emitters of said first and second transistors, means for applying bias from said second source of bias potential to the emitters of said third and fourth transistors, a fifth and sixth transistor each having a base, emitter, and collector electrode, means connecting the third transistor collector to said fifth transistor base, means connecting the fourth transistor collector to said sixth transistor base, a first and second source of potential, a first resistor connecting the emitter of said fifth transistor to said first source of potential, a second resistor connecting the emitter of said sixth transistor to said first source of potential, first and second diodes each having an anode and a cathode, means connecting said anodes togther to form a first junction, a connection between said first diode cathode and said fifth transistor emitter, a third resistor connected between said first source of potential and said first junction, a fourth resistor connected between said second source of potential and said second diode cathode, said fourth resistor having a higher resistance value than said third resistor, a fifth resistor connected between the cathode of said second diode and the base of said first transistor, a first bypass capacitor connected between said second diode cathode and ground potential, a third and fourth diode each having an anode and a cathode, means connecting the anodes of said third and fourth diodes to form a second junction, means connecting the cathode of said third diode to the emitter of said sixth transistor, a sixth resistor connecting said second junction to said first source of potential, a seventh resistor connected between said second source of potential and said fourth diode cathode, an eighth resistor connected between said fourth diode cathode and the base of said second transistor, a second bypass capacitor connected between said fourth diode cathode and ground potential, means for applying input signals to the bases of said first and second transistors, means respectively coupling the collectors of said first and second transistors to the bases of said third and fourth transistor, and means for deriving an output signal from the emitters of said fifth and sixth transistors.

5. A differential amplifier having a plurality of successive stages of amplification including an input stage and an output stage, each of said successive stages including a pair of opposed amplifiers, the pair of amplifiers in said output stage comprising a first and second transistor each having base, emitter and collector electrodes, means including said successive stages of amplification coupling said input stage to the respective bases of said first and said second transistors, first and second means for respectively deriving an output from the collectors of said first and second transistors, a first feedback path coupled between the first means for deriving an output and said input stage, a second feedback path coupled between the second means for deriving an output and said input stage, means for establishing a level for output derived from said differential amplifier comprising a first and second resistor, each said first and second resistor having one end respectively connected to the first and second feedback paths and the other ends connected together, a third transistor having base, emitter and collector electrodes, means connecting said connected-together ends of said first and second resistors to the base of said third transistor, a source of clamping potential, means connecting the emitter of said third transistor to said source of clamping potential, and resistance means connecting the collector of said third transistor to the emitters of said first and second transistors.

6. The differential amplifier as recited in claim 5 wherein said first feedback path includes a first emitter-follower transistor having a base connected to the collector of said first transistor, and a low-pass filter connected between said first emitter-follower transistor emitter and said input stage, and wherein said second feedback path includes a second emitter-follower transistor having a base connected to the collector of said second transistor, and a low-pass filter connected between said second emitter-follower transistor emitter and said input stage, a source of operating potential, and means connecting said source to the respective collectors of said first and second emitter-follower transistors.

7. A differential amplifier having a plurality of successive stages of amplification including an input stage and an output stage, each of said successive stages including a pair of opposed amplifiers, the pair of amplifiers in said input stage comprising a first and second transistor each having base, emitter, and collector electrodes, a bias source, means for applying bias from said bias source to said first and second transistor emitters, the pair of amplifiers in said output stage comprising a third and fourth transistor each having base, emitter, and collector electrodes, means including said successive stages of amplification for coupling the respective collectors of said first and second transistors to the respective bases of said third and fourth transistors, a fifth and sixth transistor each having a base, emitter, and collector electrode, a source of operating potential, means connecting said source of operating potential to the respective collectors of said fifth and sixth transistors, means connecting the third transistor collector to said fifth transistor base, means connecting the fourth transistor collector to said sixth transistor base, a first and second source of potential, a first resistor connecting the emitter of said fifth transistor to said first source of potential, first and second diodes each having an anode and a cathode, means connecting said anodes together to form a first junction, a connection between said first diode cathode and said fifth transistor emitter, a second resistor connected between said first source of potential and said first junction, a third resistor connected between said second source of potential and said second diode cathode, said second resistor having a lower resistance value than said third resistor, a fourth resistor connected between said second diode cathode and the base of said first transistor, a first bypass capacitor connected between said second diode cathode and ground potential, a fifth resistor connecting said first source of potential to the emitter of said sixth transistor, a third and fourth diode each having an anode and a cathode, means connecting the anodes of said third and fourth diodes to form a second junction, means connecting the cathode of said third diode to the emitter of said sixth transistor, a sixth resistor connecting said second junction to said first source of potential, a seventh resistor connected between said second source of potential and said second diode cathode, said seventh resistor having a lower resistance value than said sixth resistor, an eighth resistor connected between said fourth diode cathode and the base of said second transistor, a second bypass capacitor connected between said fourth diode cathode and ground potential, means for applying input signals to the bases of said first and second transistors, means for deriving an output signal from the emitters of said fifth and sixth transistors, a comparator transistor having base, collector, and emitter electrodes, a first and second common-mode resistor each having one end connected to the base of said common-mode transistor and the other end to the cathodes of the respective second and fourth diodes, means establishing a source of clamping potential, a means connecting the emitter of said comparator transistor to said source of clamping potential, and resistance means connecting the collector of said common-mode transistor to the emitters of said third and fourth transistors for varying the current applied to said emitters with the output of said comparator transistor.

8. In a differential amplifier of the type having a plurality of amplification stages, an input and an output, the improvement comprising at least one low-pass feedback path between said input and output, said feedback path including an emitter-follower stage comprising a transistor having emitter, base, and collector electrodes, a source of operating potential having two opposite potential output terminals and a ground potential terminal, means respectively connecting said transistor collector and emitter to said opposite potential output terminals of said source of operating potential, a first and second diode having their anodes connected together to form a junction, means connecting the cathode of said first diode to the emitter of said transistor, means connecting the cathode of said second diode to said amplifier input, a first resistor connected between one of said source of operating potential output terminals and said junction, a second resistor connected between the other of said source of operating potential output terminals and the cathode of said second diode, and a capacitor connected between the cathode of said second diode and said ground potential terminal.

References Cited by the Examiner

UNITED STATES PATENTS

| | | | |
|---|---|---|---|
| 2,780,682 | 2/57 | Klein | 330—69 |
| 2,833,870 | 5/58 | Wilhelmsen | 330—24 X |
| 2,847,519 | 8/58 | Aronson | 330—13 |
| 2,918,630 | 12/59 | Kiebert | 330—123 X |
| 2,921,266 | 1/60 | Kiebert | 330—123 X |
| 2,929,998 | 3/60 | Diehl | 330—22 |
| 2,956,236 | 10/60 | Klestadt | 330—123 |
| 3,011,130 | 11/61 | Marenholtz | 330—13 |
| 3,012,197 | 12/61 | Peterson | 330—29 |
| 3,018,446 | 1/62 | Knudson | 330—29 |
| 3,125,726 | 3/64 | Clifton | 330—22 X |

OTHER REFERENCES

Slaughter: Feedback Transistor Amplifier Electronics, May 1955, pages 174 and 175.

ROY LAKE, *Primary Examiner.*

BENNETT G. MILLER, NATHAN KAUFMAN, *Examiners.*